(12) United States Patent
Spähn et al.

(10) Patent No.: US 10,632,854 B2
(45) Date of Patent: Apr. 28, 2020

(54) METHOD AND SYSTEM FOR CONTROLLING CHARGING OF A VEHICLE BASED ON THEFT INFORMATION

(71) Applicant: AUDI AG, Ingolstadt (DE)

(72) Inventors: Michael Spähn, Ingolstadt (DE); Jens Schulz, Altmannstein (DE); Andreas Schlaudraff, München (DE)

(73) Assignee: AUDI AG, Ingolstadt (DE)

( * ) Notice: Subject to any disclaimer, the term of this patent is extended or adjusted under 35 U.S.C. 154(b) by 30 days.

(21) Appl. No.: 15/949,387

(22) Filed: Apr. 10, 2018

(65) Prior Publication Data

US 2018/0297482 A1    Oct. 18, 2018

(30) Foreign Application Priority Data

Apr. 12, 2017   (DE) .................. 10 2017 206 352

(51) Int. Cl.
| | | |
|---|---|---|
| *B60L 53/65* | (2019.01) | |
| *B60L 11/18* | (2006.01) | |
| *B60L 53/16* | (2019.01) | |
| *B60R 25/102* | (2013.01) | |
| *B60R 25/30* | (2013.01) | |

(52) U.S. Cl.
CPC .......... *B60L 11/1846* (2013.01); *B60L 53/16* (2019.02); *B60L 53/65* (2019.02); *B60R 25/102* (2013.01); *B60R 25/30* (2013.01); *B60L 2270/32* (2013.01); *B60L 2270/36* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC . B60L 11/1846; B60L 2270/36; B60R 25/102
USPC .......................................................... 320/109
See application file for complete search history.

(56) References Cited

U.S. PATENT DOCUMENTS

| | | | |
|---|---|---|---|
| 8,102,248 B2 | 1/2012 | Yasuda et al. | |
| 9,270,463 B2 * | 2/2016 | Unagami | ................ B60L 53/68 |
| 2004/0098179 A1 | 5/2004 | Sokoloski et al. | |

(Continued)

FOREIGN PATENT DOCUMENTS

| | | |
|---|---|---|
| DE | 102011077472 A1 | 12/2012 |
| DE | 112012002869 T5 | 3/2014 |

(Continued)

OTHER PUBLICATIONS

Examination Report dated Dec. 22, 2017 of corresponding German application No. 102017206352.1; 10 pgs.

(Continued)

*Primary Examiner* — Jerry D Robbins
(74) *Attorney, Agent, or Firm* — Maier & Maier, PLLC

(57) ABSTRACT

A system for controlling a charging process of a vehicle. A control device that is designed for the purpose of verifying, based on theft information, whether the vehicle has been reported as stolen and to control a charging process of the vehicle in dependence on this verification. The vehicle itself includes the control device. Furthermore, a vehicle having such a control device as well as a method for controlling a charging process of a vehicle is provided.

11 Claims, 1 Drawing Sheet

(56) References Cited

U.S. PATENT DOCUMENTS

| | | | |
|---|---|---|---|
| 2005/0179320 A1* | 8/2005 | Shimomura | B60R 25/2018 307/10.4 |
| 2007/0247281 A1* | 10/2007 | Shimomura | B60R 25/2018 340/5.72 |
| 2009/0224724 A1 | 9/2009 | Ma et al. | |
| 2009/0251300 A1 | 10/2009 | Yasuda | |
| 2010/0010698 A1* | 1/2010 | Iwashita | B60L 3/12 701/22 |
| 2012/0139695 A1* | 6/2012 | Jung | B60L 53/16 340/5.6 |
| 2017/0046744 A1* | 2/2017 | Li | G06Q 30/0267 |

FOREIGN PATENT DOCUMENTS

| | | |
|---|---|---|
| DE | 102014114823 A1 | 4/2015 |
| EP | 2693596 B1 | 7/2016 |
| FR | 2 970 923 A1 | 8/2012 |

OTHER PUBLICATIONS

European Search Report dated Aug. 30, 2018, in connection with corresponding EP Application No. 18164916.1 (8 pgs.).

* cited by examiner

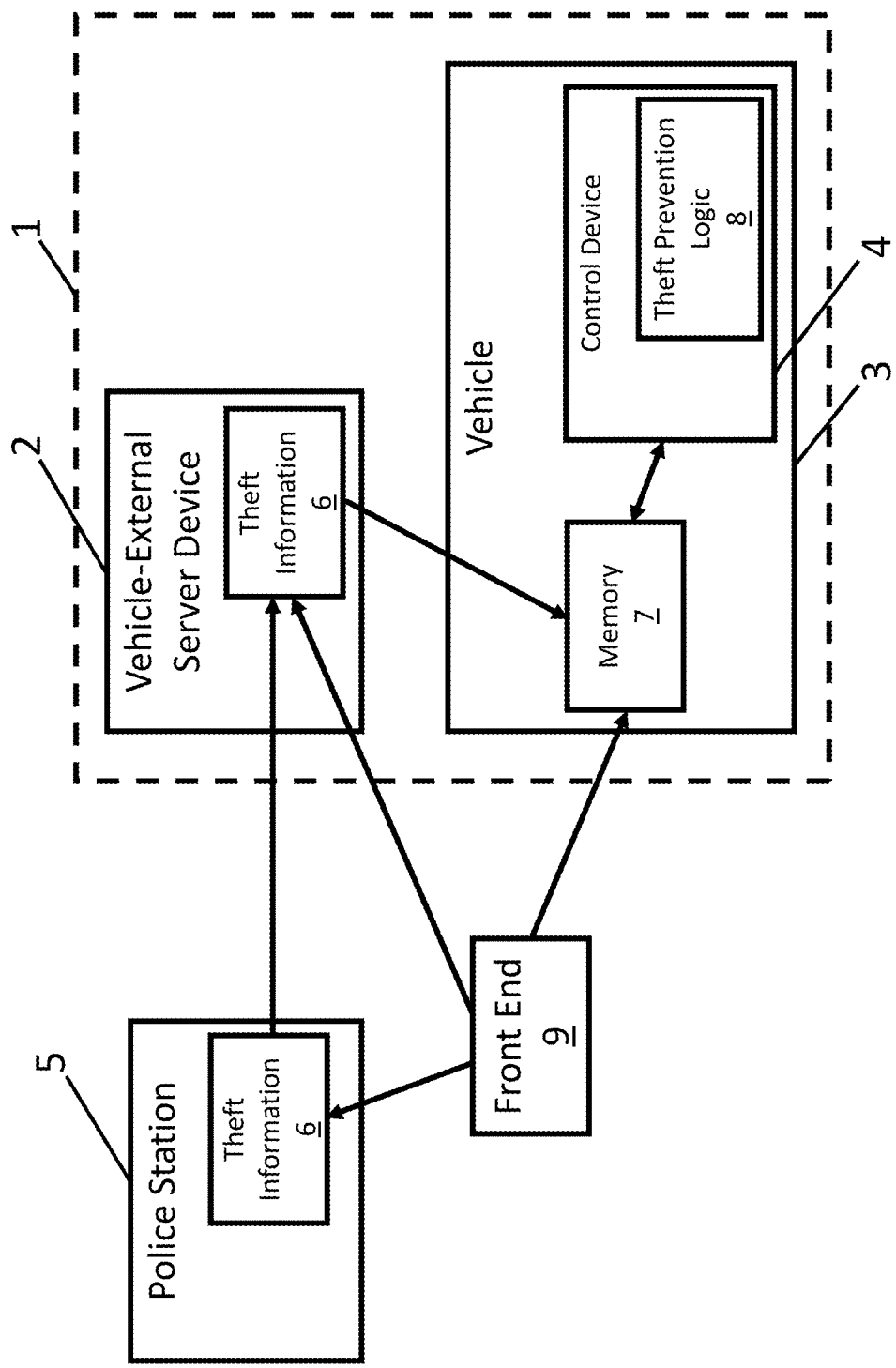

METHOD AND SYSTEM FOR CONTROLLING CHARGING OF A VEHICLE BASED ON THEFT INFORMATION

FIELD

The invention relates to a method and a system for controlling a vehicle of the kind indicated in the preambles of the independent patent claims. Furthermore, the invention relates to a vehicle with a control device for controlling a charging process of the vehicle.

BACKGROUND

It is known in and of itself how to undertake a modification during charging processes of electric vehicles, in particular, in order to improve the chances of recovering a stolen electric vehicle.

Thus, DE 11 2012 002 869 T5 describes a method for controlling a charging process of an electric vehicle. As soon as the electric vehicle has been connected to a charging device, the latter demands a distinct vehicle identification from a control unit of the motor vehicle. The vehicle identification so obtained is transmitted by the charging device to an authentication device, which is part of a server device external to the vehicle. The authentication device determines, based on the vehicle identification, whether the electric vehicle has been reported as stolen. The authentication device transmits a corresponding signal to the charging device which indicates whether or not the vehicle has been stolen. If it is a stolen vehicle, a control device of the charging device, prevents a charging of the battery of the electric vehicle.

DE 10 2011 077 472 A1 and EP 2 693 596 B1 likewise describe respective methods for controlling a charging process of an electric vehicle. As soon as the electric vehicle has become connected to a charging station, a control unit of the charging station verifies whether the electric vehicle has been reported as stolen. If this should be the case, the control unit of the charging station interdicts a charging process of the electric vehicle.

US 2004/0098179 A1 describes a method for securing a motor vehicle. As soon as the motor vehicle is connected to a charging station for re-charging, a control device external to the vehicle verifies whether the motor vehicle has been reported as stolen. If this should be the case, the vehicle-external control device prevents an uncoupling of the motor vehicle from the charging station.

U.S. Pat. No. 8,102,248 B2 describes a method in which a charging process of a motor vehicle at a charging station is prevented if the motor vehicle has been reported as stolen. The verification as to whether the motor vehicle has been reported as stolen is carried out by means of a server device of a police station.

SUMMARY

The object of the present invention is to provide an improved theft protection for vehicles.

This object is achieved by means of a system and a method for controlling a charging process of a vehicle, as well as by means of a vehicle with a control device for controlling a charging process of the vehicle, having the features of the independent patent claims. Advantageous embodiments with expedient and nontrivial enhancements of the invention are indicated in the dependent claims.

The system according to the invention for controlling a charging process of a vehicle comprises a control device which is designed for the purpose of verifying, based on theft information, whether the vehicle has been reported as stolen and to control a charging process of the vehicle in dependence on this verification. The system according to the invention is characterized in that the vehicle itself comprises the control device. Thus, the charging control according to the invention is carried out directly by the vehicle itself and is thus independent of a charging point, a charging type, or a charging standard. In the system according to the invention, it is not necessary for the operator of the charging column, for example to call the police in Germany, Austria, Italy, and the like, in order to be able to obtain and provide trans-national theft information.

In the system according to the invention, as soon as the theft information is available on the vehicle side, the charging functionality of the vehicle can be directly affected by means of the control device on the vehicle side. If the vehicle might have been stolen, a re-charging of the vehicle can be restricted in any way desired, without having to first check with the country-specific theft databases, for example. Preferably, the control device on the vehicle side can be designed to verify, prior to any charging process, for example, as soon as the vehicle has been connected to a private and/or public charging station, whether the vehicle has been reported as stolen. The theft information, for example, may be stored in the form of an electronic feature in the form of a file on the vehicle side. Furthermore, a predefined extent may be stored in the control device specifying the form in which the charging process of the vehicle should be modified and, in particular, impeded in event of a reported theft.

The theft information may be stored in the most various ways in the vehicle. Preferably, the theft information is stored in the vehicle in such a way that it cannot be disabled by removing a single component, for example, by replacing a charging device on the vehicle side. Furthermore, the vehicle is designed such that the theft information from the most various sources can be received in wireless manner, for example, via a mobile phone or radio network or also via a WLAN link.

The described system for controlling a charging process of a vehicle is thus especially suited to theft prevention by a modification of a charging function. The system may be expanded to all products or applications which are electrically re-charged and which have a communication interface, such as for a mobile phone or radio network and/or a WLAN. For example, the system according to the invention can also be transferred to e-bikes, e-rollers, e-scooters, e-jet skis, e-boats and the equivalent. The system may also be transmitted, for example, to products in the field of entertainment electronics, also known commonly as consumer electronics.

Thus, by means of the system according to the invention it is possible to make a modification of the charging function of the particular vehicle, for example in order to impede the escape of a thief and make it much easier for the authorities to gain access to the stolen vehicle. Furthermore, thanks to the reduced charging functionality, a stolen vehicle loses much of its value, so that a reselling of the stolen vehicle is much more difficult and thus the incentive to steal it is much less. Due to the significantly lower attractiveness of the vehicle for a theft, the insurance expenses and with them the insurances classes of this type of vehicle are also lower. This, in turn, lowers the costs to the particular consumers of this type of vehicle.

One advantageous embodiment of the invention provides that the system comprises a server device external to the vehicle, which is designed for the purpose of transmitting the theft information to the vehicle. For example, the manufacturer of the vehicle may operate this vehicle-external server device, in order to be able to make sure that, in the event of a theft, the theft information entering into the server device can be transmitted wirelessly directly to the vehicle. In this way, it can be assured that, in the event of a theft, the control device can verify especially early on, based on the theft information, whether the vehicle has been reported as stolen, so as to control and especially so as to modify the charging process of the vehicle in dependence on this verification, so that the vehicle cannot be further moved, or can be moved only to a very limited extent. It is also possible for an owner of the vehicle or an authorized third party to be able to log into a front-end or to be able to control the function in a front-end, in order to transmit the theft online to the vehicle-external server device. For this, the owner needs only have on hand his/her user identification and a corresponding password, for example.

Another advantageous embodiment of the invention provides that the vehicle-external server device is designed for the purpose of receiving the theft information from an authority, especially from a police authority. For example, an owner of the vehicle can simply call up the police authority, after which the police will relay the theft information to the vehicle-external server device. Preferably, the vehicle-external server device is networked with a plurality of police authorities in the most varied places and countries, so that incoming theft information can be processed directly, after which the control device on the vehicle side, in the event of a theft, can modify the charging capabilities of the vehicle so that a vehicle thief can be apprehended especially quickly.

In another advantageous embodiment of the invention, it is proposed that the vehicle-external server device is designed for the purpose of receiving the theft information from a mobile terminal, especially from a smartphone. For example, a user of the vehicle can simply send an SMS to his vehicle that has just been stolen. Alternatively or additionally, it is also possible to install a special app on the smartphone for the eventuality of a theft, whereby the owner of the vehicle simply has to start the app and press a certain button, for example, and then the theft information is transmitted directly to the vehicle-external server device. Due to the fact that the vehicle-external server device is preferably designed for the purpose of receiving the theft information from a mobile terminal, the owner of the vehicle, in the event of a theft, can react especially quickly and have the theft information relayed by way of the vehicle-external server device to his stolen vehicle, so that the control device in turn can become active in order to modify the charging process of the vehicle.

According to another advantageous embodiment of the invention, it is provided that the system comprises a smartphone, which is designed to transmit the theft information at least indirectly to the vehicle. On the one hand, it may be provided that the smartphone is designed for the purpose of transmitting the theft information, for example once again via an installed app, to the vehicle-external server device. Alternatively or additionally, however, the smartphone may also be designed for the purpose of transmitting the theft information directly and without detouring through the vehicle-external server device to the vehicle. Because the system preferably comprises said smartphone, the owner of the vehicle can react especially quickly in the event of a theft and have the theft information relayed to his stolen vehicle.

Another advantageous embodiment of the invention provides that the control device is designed for the purpose of restricting and/or preventing a re-charging of the vehicle. For example, the control device may be designed to hinder a re-charging of the vehicle by means of direct current, by means of alternating current, or also a three-phase re-charging. Furthermore, the control device may also be designed to permanently disable any re-charging of the motor vehicle regardless of the kind of charging. Moreover, the control device may also be designed for the purpose of restricting a charging power. For example, the re-charging power may be restricted to 1 kW. In the case of an 80 kWh battery, this would mean that a complete re-charging of a fully discharged battery would take 80 hours, i.e., more than 3 days. Because the control device is designed for the purpose of restricting and/or of preventing the re-charging of the vehicle in the event of a theft, it can be reliably prevented that a thief can drive very far with the vehicle.

In another advantageous embodiment of the invention it is provided that the control device is designed for the purpose of preventing an authentication necessary for a re-charging of the vehicle at a charging station. For example, the vehicle may be basically designed to be simply connected to a charging station in order to then be recharged in a cashless transaction, for example, after a successful authentication. Because the control device is preferably designed to prevent the necessary authentication at a charging station when re-charging the vehicle, a thief is prevented from re-charging the vehicle at the expense of the owner.

Another advantageous embodiment of the invention provides that the control device is designed for the purpose of preventing an unlocking of a charging plug inserted into the vehicle. In this way, the stolen vehicle can be retained on the spot in a reliable manner.

According to another advantageous embodiment of the invention it is provided that the control device is designed for the purpose of discharging the vehicle by way of a charging column connected to the vehicle. In order to further reduce the range of the stolen vehicle, it may even be provided to discharge the battery of the motor vehicle at suitable charging stations, so that the vehicle can no longer be moved away.

The vehicle according to the invention comprises a control device, which is designed for the purpose of verifying, based on theft information, whether the vehicle has been reported as stolen and of controlling a charging process of the vehicle, in dependence on this verification. The advantageous embodiments of the control device explained in connection with the system according to the invention apply equally to the control device of the vehicle according to the invention. The vehicle is preferably a motor vehicle, especially an automobile.

In the method according to the invention for controlling a charging process of a vehicle, it is verified based on theft information whether the vehicle has been reported as stolen. A charging process of the vehicle is controlled in dependence on this verification. The method according to the invention is characterized in that the verification as to whether the vehicle has been reported as stolen and the controlling of the charging process is carried out by means of a control device of the vehicle. Advantageous embodiments of the system according to the invention are to be seen as advantageous embodiments of the method according to the invention and vice versa, wherein the system and/or the vehicle, in particular, have means of carrying out the steps of the method.

Additional advantages, features and details of the invention will emerge from the following description of preferred exemplary embodiments, as well as on the basis of the drawing. The features and combination of features mentioned above in the description as well as the features and feature combinations indicated below in the description of the figures and/or features and feature combinations shown only in the FIGURES may be used not only in the indicated combination, but also standing alone or also in other combinations, without leaving the scope of the invention.

BRIEF DESCRIPTION OF THE DRAWING

FIG. 1 shows a schematic representation of a system for theft prevention of a vehicle, comprising a control device on the vehicle side which is designed for the purpose of modifying a charging process of the vehicle in the event of a theft.

DETAILED DESCRIPTION OF THE DRAWING

A system 1 comprises a vehicle-external server device 2 and a plurality of electrically driven vehicles 3, wherein, for the sake of simplicity, only one of the vehicles 3 is represented at present. The system 1 serves for being able to provide a theft prevention for the vehicle 3, in the event of it being stolen. The vehicle 3 comprises a control device 4, which can be, for example, part of a charging device on the vehicle side, which will not be explained here in more detail. The control device 4 may act in various ways on a charging process of the vehicle 3, especially in the event of a theft of the vehicle 3.

An authority in the form of a police station 5 is furthermore shown schematically. An owner of the vehicle 3 may call the police station 5 in order to report a theft of his vehicle 3. The police authority 5 thereupon saves electronic theft information 6, which is then transmitted from the police station 5 to the vehicle-external server device 2.

For example, it is also possible for the owner of the vehicle 3 to report the theft electronically and wirelessly to the police station 5 by means of a smartphone, which is not represented here, and which serves as a front-end 9. At the front-end 9, such as one in the form of the mentioned smartphone, which can also be part of the system 1, an app may be installed, for example, by means of which the theft information 6 can be sent by a simple pressing of a button to the nearest police station, in the present example the police station 5 represented here. Alternatively or additionally, it is also possible for the owner of the just stolen vehicle 3 to transmit the theft information 6 to his stolen vehicle 3 directly via his smartphone without any detours.

Once the theft information 6 has been transmitted to the vehicle-external server device 2, this device can save the theft information 6 itself, for example in a memory 7 on the vehicle side. This saving is preferably performed wirelessly, for example, by way of a mobile phone or radio network or the equivalent. A plurality of these memories 7 may also be provided at the most varied locations in the vehicle 3, so that the theft information 6 is saved in a distributed manner and, in particular, is difficult to locate in the vehicle 3.

Whenever the stolen vehicle 3 is connected to a charging capability, such as, for example, a public charging station or a private charging station, a theft prevention logic 8 saved in the control device 4 is initiated. Thus, as soon as the stolen vehicle 3 is coupled to a charging capability, the control device 4 at first checks once according to the logic 8 whether the mentioned theft information 6 has been saved in the memory 7 on the vehicle side or also in other vehicle-side memories, which are not represented here. If no theft information 6 has been saved, the vehicle 3 can be charged without any problem. In contrast, if the theft information 6 has been saved on the vehicle side, the control device 4 then modifies a charging process in such a way that it is difficult to drive the vehicle 3 any further.

Alternatively, the control device 4 may already be appropriately modified when the information 6 is entered, and not just when the charging process is started. Alternatively, furthermore, corresponding information may be present in the motor vehicle, which states that the vehicle 3 has not been stolen. After a given time, this information elapses. If this information is not updated in timely manner before it elapses, the charging function will be modified at private and/or public charging points, as described above.

The control device 4 may restrict a kind of charging, so that the vehicle 3, for example, can no longer be charged with direct current, no longer with alternating current, or also no longer with three-phase current. Furthermore, it is also possible for the control device 4 to not allow any re-charging of the vehicle 3. Furthermore, it is also possible for the control device 4 to limit a charging power with which a battery of the vehicle 3 can be re-charged. For example, a limiting to 1 kW can be carried out, so that in the case of an 80 kWh battery, a full charging of the totally discharged battery would take 80 hours.

Furthermore, it may also be provided that the control device 4 prevents an authentication, such as, e.g., a plug & charge authentication, by the vehicle 3. Thus, whenever an authentication by the vehicle 3 is necessary after connecting the vehicle 3 to a charging station, the control device 4 can prevent the vehicle 3 from successfully authenticating itself. Consequently, the vehicle 3 can no longer be re-charged at such a charging station.

Furthermore, the control device 4 may also prevent a charging plug from being unlocked and removed from the vehicle 3, for example. In this way, the control device 4 may ensure that the vehicle 3 can no longer be taken away from the particular charging point, such as, e.g., a private or public charging column. Furthermore, the control device 4 may also be designed to discharge a battery of the vehicle 3 as soon as the vehicle 3 has been connected to a suitable charging station, in order to further decrease the driving range of the stolen vehicle 3.

If the vehicle 3 has been reported as stolen, the location of the vehicle 3 can be traced, for example, by way of tracking functionalities. For example, an owner of the vehicle 3 may track the location of the stolen vehicle 3 directly by way of his smartphone. The control device 4 on the vehicle side may resort to one or more of the above-described measures in order to prevent the vehicle 3 from proceeding further. Or, for example, if a person has committed a crime and is escaping in such a vehicle 3, the above-described measures may likewise impede the charging of a battery of the vehicle 3 in question and thus make it much easier for the authorities to catch the escaping person. Basically, the ability to modify the most varied charging functions of the affected vehicle 3 can make it difficult for the vehicle 3 to proceed any further, in a simple and efficient way.

Furthermore, it is also possible for the vehicle 3 itself to recognize a theft or an attempted theft and to save the information 6 itself on the vehicle side. The control device 4 then modifies a charging process so that further travel with the vehicle 3 is impeded. This information 6 is represented in the vehicle 3 by the absence of a feature, e.g., by a time-limited certificate, which is generally refreshed. When the certificate expires, the charging function is modified as described above.

The invention claimed is:

1. A system for controlling a charging process of a vehicle, comprising:
   an information storage element configured to store theft information; and
   a control device configured to verify, based on the theft information stored in the information storage element, whether the vehicle has been reported as stolen and to control a charging process of the vehicle in dependence on this verification, wherein the control device and the information storage element are components of the vehicle,
   wherein the theft information comprises a timed certificate which indicates that the vehicle is not stolen, so that if a predetermined amount of time elapses without the timed certificate being refreshed or reset, the control device controls the charging process of the vehicle as if the vehicle has been reported as stolen.

2. The system according to claim 1, wherein the system includes a server device external to the vehicle, which is designed for the purpose of transmitting the theft information to the vehicle.

3. The system according to claim 2, wherein the vehicle-external server device receives the theft information from an authority, especially from a police authority.

4. The system according to claim 2, wherein the vehicle-external server device receives the theft information from a mobile terminal, especially a smartphone.

5. The system according to claim 1, wherein the system includes a smartphone, which transmits the theft information directly or at least indirectly to the vehicle.

6. The system according to claim 1, wherein the control device restricts and/or prevents a re-charging of the vehicle.

7. The system according to claim 1, wherein the control device prevents an authentication necessary for a re-charging of the vehicle at a private and/or public charging station.

8. The system according to claim 1, wherein the control device prevents an unlocking of a charging plug inserted into the vehicle.

9. The system according to claim 1, wherein the control device is designed for the purpose of discharging the vehicle by way of a charging column connected to the vehicle.

10. A vehicle having:
    an information storage element configured to store theft information; and
    a control device configured to verify, based on the theft information stored in the information storage element, whether the vehicle has been reported as stolen and to control a charging process of the vehicle in dependence on this verification,
    wherein the theft information comprises a timed certificate which indicates that the vehicle is not stolen, so that if a predetermined amount of time elapses without the timed certificate being refreshed or reset, the control device controls the charging process of the vehicle as if the vehicle has been reported as stolen.

11. A method for controlling a charging process of a vehicle, comprising:
    verifying based on theft information stored in an information storage unit of the vehicle whether the vehicle has been reported as stolen; and
    controlling a charging process of the vehicle in dependence on this verification, wherein the verification as to whether the vehicle has been reported as stolen and the controlling of the charging process is carried out by a control device of the vehicle,
    wherein the theft information comprises a timed certificate which indicates that the vehicle is not stolen, so that if a predetermined amount of time elapses without the timed certificate being refreshed or reset, the control device controls the charging process of the vehicle as if the vehicle has been reported as stolen.

* * * * *